3,127,234
METHOD OF PRODUCING POLYOLEFIN SHAPED ARTICLES CONTAINING A COMPATIBLE POLYMERIC SUBSTANCE HAVING ACID ANHYDRIDE OR ACID HALIDE GROUPS
William Alexander O'Neill, Harrogate, England, assignor to Imperial Chemical Industries Limited, London, England, a corporation of Great Britain
No Drawing. Filed Apr. 14, 1961, Ser. No. 102,937
Claims priority, application Great Britain Apr. 22, 1960
9 Claims. (Cl. 8—115.5)

This invention relates to a method of producing improved polyolefin articles; in particular shaped articles, such as filaments and fibres of stereoregular polyolefines, having increased affinity for dyestuffs.

The discovery of stereospecific catalysts for the polymerisation of olefines has enabled the formation of stereoregular polyolefines as described for example in British Patent No. 810,023. Such polyolefines have provided a new and valuable source of shaped articles such as fibres and films amongst which fibres of isotactic polypropylene are particularly important. Polyolefines are, however, very difficult to dye mainly because of their hydrophobic character and low permeability. Sites to which dyestuffs can attach themselves, such as are available in polyamides, are of course absent in hydrocarbon polymers. This lack of dye-affinity is a major drawback in shaped articles and is most serious in fibres for textile applications.

A considerable number of methods for the improvement of dye-affinity, including treatment and modification of both olefin polymers and of articles shaped therefrom have been proposed. These include the addition of coloured substances or substances containing active groups to the polymer composition prior to the shaping process. However, the introduction of coloured pigments allows the production of only a limited range of colours and substances containing groups which directly confer dye-affinity are generally immiscible with polyolefines. After-treatment of polyolefin articles, such as fibres, with reactive substances to bring about chemical modification often affects only the surface layer of polyolefin and the ensuing improvement in dye-uptake may be restricted thereto.

According to my invention I provide a method of producing articles containing or composed of polyolefines having improved dye-affinity characterised in that the articles are shaped from a composition wherein the polyolefin is combined with a compatible polymeric substance containing acid anhydride or acid groups. By compatible polymeric substance is meant a substance comprising at least two identical structural components which is soluble in, and preferably mutually soluble with, the molten polyolefin. Such substanecs are necessarily covalent in character. In contrast substances containing ionic linkages are incompatible with hydrocarbon polymers and it is, of course, this conflict of properties which normally prevents the penetration of dyestuffs into polyolefines and makes colouration by conventional methods very difficult.

Treatment of polyolefines containing acid anhydrides or acid halides with water creates, in situ, the corresponding free acid and having become ionic in character the additive is trapped in the polyolefin where it provides permanent centres of dye-affinity. Similarly treatment with aqueous alkali forms the salt of the appropriate acid within the polyolefin. In this way affinity for basic and disperse dyestuffs is produced; a simple adaptation of the technique being to dye an article in which acid anhydride or acid halide groups are present with a basic dyestuff from an aqueous dyebath so that the salt formed contains a coloured cation.

If an article of a polyolefin modified in accordance with my invention is treated with a nitrogenous base, amine or substituted amine groups are introduced which confer affinity for acid dyestuffs. After-treatment with water or an organic base may be integrated with the step of shaping the article, for instance extruded filaments of modified polypropylene or polyethylene may be passed through a bath containing the reagent prior to, or after drawing. Thus while in commercial practice polyolefin articles incorporating polymeric substances containing acid anhydride or chloride groups would normally be marketed in that form and thereafter dyed by the customer to his own requirements, it is also possible to carry out a treatment, preferably with water, in order to "fix" the additive, before the article is sold. My invention therefore further provides articles, shaped from polyolefines with which a compatible polymeric substance containing acid anhydride or acid halide groups has been combined, treated with a reagent which converts these groups to the corresponding free acid or a salt or amine derivative thereof.

The formation of shaped articles, such as filaments, fibres and films, is frequently carried out by extrusion of a molten polymer composition through an orifice of suitable dimensions. It is therefore important that the substance included with the polyolefin should have good thermal stability and low vapour pressure in order to minimise degradation, discolouration and loss by volatilisation during the shaping process. In this respect substances of a polymeric nature are a special value and are superior to simple acid halides. Being dissolved in the polyolefin the covalent additive does not interfere with extrusion processes and is therefore very suitable for the production of fine filaments such as low denier filaments of isotactic polypropylene. The subsequent conversion of the additive to an ionic species can cause precipitation from the polyolefin but the substance nevertheless remains molecularly distributed and can still assist the diffusion of dyestuffs. The process of dyeing my modified polyolefines may be carried out by any process known in the art including dyeing under pressure and in the presence of dyeing assistants such as hydrocarbon, halohydrocarbon and phenolic substances.

In the case of acid anhydride groups suitable additives are polymeric anhydrides themselves, i.e., polymers in which the main chain is formed by anhydride linkages. Typical examples are the linear polymeric anhydrides of dicarboxylic acids such as terephthalic acid or sebacic acid. Acid halide groups are readily available as substituents in polymers wherein the main chain is inert. For example acid halide groups may be introduced into polymeric hydrocarbons such as polystyrene by reaction with phosphorus trichloride and oxygen as described for simple hydrocarbons by Clayton and Jensen, J.A.C.S., 70, 3880 (1948). Polyolefines themselves may be phosphochlorinated in this way and their subsequent combination with an unmodified polyolefin gives blocks within the final polymer containing —$POCl_2$ groups.

The quantity of acid anhydride or acid halide necessary to confer good dyeability on the shaped article is quite small and in general, less than ten percent by weight of polymeric additive in the shaping composition will suffice. We have found that as little as one acid halide group per hundred polymer molecules in the composition produces a marked effect. When the reactive groups are associated with a polymer of structure akin to the polyolefin it is, of course, possible to tolerate a comparatively high concentration of additive in the final composition without detracting from the valuable properties of articles, such as the high tenacity of filaments and yarns.

In the process of our invention polymeric substances containing anhydride groups are commonly based on carboxylic acids. Acid halide groups may be derivatives of carboxylic acids or acids of sulphur or phosphorus. More particularly our invention provides a method of manufacturing improved articles containing or composed of polyolefines characterised by incorporation in the polyolefin of a phosphonitrile halide comprising the structural unit

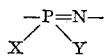

where X and Y are halogens. The phosphonitrile halide may be either cyclic or linear in character, the common form being the cyclic trimer

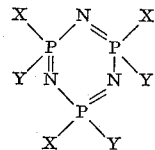

which on heating can give rise to high molecular weight linear polymers. This polymerisation process can occur during the formation of films and filaments of the polyolefin, i.e., the heating and melting of the polyolefin prior to melt extrusion brings about polymerisation of the phosphonitrile halide. Addition of phosphonitrile halides give good affinity for basic and disperse dyestuffs; the former being most effectively applied from an alkaline dyebath. Under these conditions the dyestuff is essentially undissociated and penetrates more readily into the polyolefin.

It is preferred to use phosphonitrile chlorides as additives in our process since these polymeric compounds are not degraded at temperatures up to at least 350° C. and their presence causes little or no colour formation during the melt spinning of polyolefines. The acid halide groups X and Y may be replaced by other groups in the manner already described and where the new groups are basic in character affinity is, of course, towards acid dyestuffs. Accordingly our invention provides articles of polyolefines, particularly isotactic polypropylene, characterised by inclusion of a phosphonitrile halide and subsequent conversion, in situ, of the halide groups to hydroxyl or amine groups.

Colouration by basic, disperse or acid dyestuffs is very uniform and, in general, good intensities are obtained by dyeing under ordinary conditions, when between 0.5 and 5.0 percent by weight of phosphonitrile halide is added. The light fastness of colours on polyolefines containing phosphonitrile halides or derivatives thereof, particularly on fibres of isotactic polypropylene, is high and our experimental data suggest that, in addition to providing centres of dye-affinity, phosphonitrile compounds have a stabilising influence on the polyolefin and dyestuffs therein. Stabilisation of polyolefines containing tertiary carbon atoms is, of course, very important since such polymers are very susceptible to oxidative degradation either of a thermal character or that brought about by ultra-violet light. Substances known to be stabilizers for polyolefines or for other polymers such as rubbers may be introduced into polyolefines produced in the manner of our invention as an additional precaution.

A review of phosphonitrile chloride and derivatives thereof is published in Endeavour, vol. XIX, Number 75, page 134 (July 1960), and a number of the reactions described can be utilised in the process of our invention.

Valuable textile fibres may be produced by our process, particularly from stereoregular polymers and copolymers of ethylene and propylene. These fibres may be used in the form of mixtures with other fibres, e.g., wool and cotton. Such fibre blends may be dyed using mixtures of dyestuffs from the same dyebath, for instance blends of modified polyolefin fibres with wool may be conveniently coloured in a dyebath containing a disperse dyestuff together with an acid wool dyestuff.

The following examples present data which illustrate the invention.

EXAMPLES 1–10

Various polymeric substances containing acid anhydride or acid halide groups were incorporated with isotactic polypropylene having intrinsic viscosity 2.6 (measured in tetralin at 135° C.) in amounts between 0.2 and 10 percent by weight. This was done by either intimately mixing the two finely divided materials or by dissolving polmer and additive in a common inert solvent such as xylene followed by precipitation by cooling or by adding a non-solvent. The dry compositions gave homogeneous melts which were spun at temperatures between 200° C. and 300° C., generally about 280° C., and the filaments drawn over a heated pin in the conventional manner. The filaments were then chopped up and the resultant fibres dyed in aqueous dyebaths as shown in Table 1.

*Table 1*

| No. | Additive | Weight Percent of Additive | Dyestuff Class and Colour Index Reference | Dyeing Conditions | Fibre Colour | Light Fastness |
|---|---|---|---|---|---|---|
| 1 | Polysebacic anhydride | 0.2 | Disperse, C.I. 11110 | 100°C for 90 minutes. 0.15% (wt.) dye concentration in neutral dyebath. Liquor/Goods ratio 40/1. | Orange Red | 4 |
| 2 | ----do---- | 2.0 | ----do---- | | Red | 4–5 |
| 3 | ----do---- | 10.0 | ----do---- | | ----do---- | 4–5 |
| 4 | Polyadipic anhydride | 5.0 | Disperse, C.I. 11855 | | Yellow | 5 |
| 5 | ----do---- | 10.0 | ----do---- | | ----do---- | 5 |
| 6 | Phosphochlorinated polystyrene. | 0.5 | Basic, C.I. 52015 | 100°C for 60 minutes. 0.1% (wt.) dye concentration in slightly alkaline dyebath. Liquor/Goods ratio 40/1. | Blue | 3 |
| 7 | ----do---- | 2.0 | ----do---- | | Deep Blue | 3 |
| 8 | ----do---- | 5.0 | ----do---- | | ----do---- | 3 |
| 9 | Phosphochlorinated polypropylene. | 2.0 | Basic, C.I. 42000 | As in expts. 6–8 | Deep Green | 4–5 |
| 10 | ----do---- | 10.0 | ----do---- | | ----do---- | 5 |

EXAMPLES 11–20

In this series of experiments the additive was triphosphonitrile chloride, the procedure being otherwise as in Examples 1–10. The results are presented in Table 2.

Table 2

| No. | Weight percent phosphonitrile chloride | Dyestuff Class and Colour Index Reference | Dyeing Conditions | Fibre Colour | Light fastness |
|---|---|---|---|---|---|
| 11 | 0.5 | Basic, C.I. 52015 (Methylene Blue) | 100° C. for 1 hour. 0.1% dye concentration in dyebath. Liquor: Goods ratio 40:1 pH adjusted to 8. | very deep blue | 3 |
| 12 | 2.0 | (Methylene Blue) | | very deep blue | 3-4 |
| 13 | 5.0 | do | | very deep blue | 5 |
| 14 | 10.0 | do | | very deep blue | 5-6 |
| 15 | 5.0 | Basic, C.I. 42000 | | deep green | 6 |
| 16 | 5.0 | Basic, C.I. 42535 | | deep violet | 4-5 |
| 17 | 5.0 | Disperse, C.I. 11110 | 100° C. for 90 mins. 0.15% dye concentration in dyebath. Liquor: Goods ratio 60:1 Neutral dyebath. | orange/red | 4-5 |
| 18 | 5.0 | Disperse, C.I. 11855 | | yellow | 4-5 |
| 19 | 5.0 | Disperse, C.I. 11005 | | orange | 4-5 |
| 20 | 10.0 | do | | do | 5 |

The light fastness measurements given in Tables 1 and 2 are on the Society of Dyers and Colourists Standard Fastness Scale.

EXAMPLE 21

High pressure polyethylene ("Polythene"), linear polyethylene ("Marlex") and a 50/50 ethylene/propylene copolymer were modified by incorporating various amounts of polysebacic anhydride and of triphosphonitrile halide in the same way as isotactic polypropylene. The modified polymers in the form of powder, fibres or film were then treated with dyestuffs as in the foregoing Examples 1-3 and 11-20 and gave similar results.

EXAMPLE 22

Portions of the fibre prepared for Examples 2, 7 and 13 were treated with ethylene diamine at 80° C. then washed with water. The resultant fibres were dyed at 100° C. for 90 minutes with an 0.1% (wt.) aqueous solution of the acid dyestuff Carbolan violet 7R (C.I. 62165). In all three cases good violet shades were obtained.

Similar results were obtained when the ethylene diamine was replaced by aqueous ammonia, hexanethylene diamine and diethylenetriamine.

COMPARATIVE RESULTS

Unmodified polypropylene was spun and treated as in the foregoing Examples 7, 13 and 17. The basic dyestuff Methylene Blue (C.I. 52015) gave fibre which was tinted pale blue. The disperse dyestuff Dispersol Fast Scarlet G (C.I. 11110) gave fibre which was tinted pale orange.

What I claim is:

1. A method of producing a shaped article comprising shaping a mixture of a polyolefin selected from the group consisting of homopolymers and copolymers of ethylene and propylene and a phosphonitrile halide consisting essentially of the repeating structural units

wherein X and Y are halogens.

2. A method of producing a shaped article as set forth in claim 1 wherein said polyolefin is isotactic polypropylene.
3. A method of producing a shaped article as set forth in claim 1 in which said article is a fiber.
4. A method of producing a shaped article as set forth in claim 1 in which said article is a filament.
5. A method of producing a shaped article as set forth in claim 1 in which said article is a film.
6. A method of producing a shaped article as set forth in claim 1 including treating the shaped article with a reagent, selected from the group consisting of water, aqueous alkali and nitrogenous base, which converts the phosphonitrile halide to a member of the group consisting of the free acid, salt and amine derivatives thereof.
7. A method of producing shaped articles as set forth in claim 1 in which the phosphonitrile halide is triphosphonitrile chloride.
8. A method of producing shaped articles as set forth in claim 1 in which the amount of phosphonitrile halide is between about 0.5 and 5.0 percent by weight.
9. A shaped article produced by the process of claim 1.

References Cited in the file of this patent

UNITED STATES PATENTS

| | | |
|---|---|---|
| 2,866,773 | Redfarn | Dec. 30, 1958 |
| 2,911,378 | Bregman | Nov. 3, 1959 |
| 2,945,828 | Henning | July 19, 1960 |
| 2,983,704 | Roedel | May 9, 1961 |
| 2,994,679 | Jones et al. | Aug. 1, 1961 |